United States Patent [19]
Kitano et al.

[11] 3,920,843
[45] Nov. 18, 1975

[54] TOPICAL FUNGICIDAL COMPOSITION FOR DERMATOMYCOSIS OF ANIMALS

[75] Inventors: Noritoshi Kitano; Shinichi Sugawara; Yukichi Kishida; Fusao Kondo; Yukio Sugimura; Nobuo Soma, all of Tokyo, Japan

[73] Assignee: Sankyo Company Limited, Tokyo, Japan

[22] Filed: Jan. 7, 1974

[21] Appl. No.: 431,030

[30] Foreign Application Priority Data
Jan. 27, 1973 Japan.............................. 48-11506

[52] U.S. Cl.................................. 424/45; 424/327
[51] Int. Cl......................... A61l 9/04; A61k 31/15
[58] Field of Search.............................. 424/327, 45

[56] References Cited
OTHER PUBLICATIONS
Chemical Abstracts 63:4276h (1965).

*Primary Examiner*—Stanley J. Friedman
*Attorney, Agent, or Firm*—Flynn & Frishauf

[57] ABSTRACT

Topical fungicidal composition for dermatomycosis of animals which comprises, as an active component, a 2-hydrazinotropone derivative having the formula

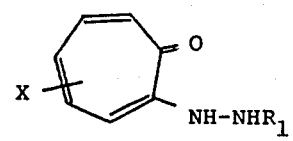

or an acid addition salt thereof, wherein $R_1$ represents an alkyl group having from one to four carbon atoms or a phenyl group which may be substituted with halogen, alkyl having from one to four carbon atoms, nitro or alkoxy having from one to four carbon atoms and X represents hydrogen atom or an alkyl group having from one to four carbon atoms together with a suitable carrier. The composition may be preferably used in aerosol form.

8 Claims, No Drawings

TOPICAL FUNGICIDAL COMPOSITION FOR DERMATOMYCOSIS OF ANIMALS

This invention relates to novel topical fungicidal compositions for the treatment of dermatomycosis of animals.

More particularly, it relates to novel topical fungicidal compositions which comprises, as an active component, a 2-hydrazinotropone derivative having the formula

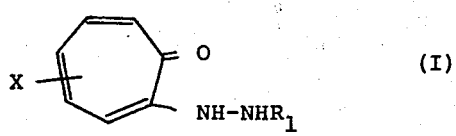

or an acid addition salt thereof, wherein $R_1$ represents an alkyl group having from one to four carbon atoms or a phenyl group which may be substituted with halogen, alkyl having from one to four carbon atoms, nitro or alkoxy having from one to four carbon atoms and X represents hydrogen atom or an alkyl group having from one to four carbon atoms together with a suitable carrier.

Dermatomycosis of animals is generally called ringworm and is a skin disease caused by various dermatophytes. The disease occurs on skins of various animals such as horse, cow, pig, cat, monkey, goat and chicken and appendages of skins such as hair, feather or claw. In the disease, there is recognized clinical finding of circular alopecia and thickened crust. Treatment of the disease is important not only for health of animals but also in the matters of public health, as the disease is infective to both human beings and animals.

Hitherto, physiotherapy, topical treatment and internal administration treatment have been applied to the treatment of dermatomycosis, but enough curing effects have not been obtained by topical treatment agents.

It was found that, as the results of extensive studies, the 2-hydrazinotropone derivatives having the above formula (I) and their acid addition salts were very useful for topical treatment of dermatomycosis of animals.

In the above formula (I), the alkyl group of $R_1$ and X is, for example, methyl, ethyl, propyl, isopropyl and butyl and the substituted phenyl group of $R_1$ is, for example, phenyl group substituted at o-, m- or p-position with alkyl such as methyl, ethyl, propyl, isopropyl and butyl, halogen such as chlorine and bromine, nitro or alkoxy such as methoxy, ethoxy, propoxy, isopropoxy and butoxy. The salts of the compound (I) are dermatologically acceptable acid addition salts of the compound (I) with a mineral acid such as hydrochloric acid, hydrobromic acid or sulfuric acid or with an organic acid such as p-toluenesulfonic acid, oxalic acid, citric acid or acetic acid.

The especially favorable compounds (I) according to this invention are those in which $R_1$ is a phenyl group which may be substituted with halogen, alkyl having from one to four carbon atoms, nitro or alkoxy having from one to four carbon atoms. The most effective compound is that in which $R_1$ is unsubstituted phenyl group and X is hydrogen atom.

Minimum inhibitory concentrations (MIC) of the compounds having the formula (I) were shown in the Table 1.

Table 1

| | Compounds[a] | 1 | 2 | 3 | 4 | 5 | 6 | 7 | 8 | 9 | 10 | 11 | 12 | 13 |
|---|---|---|---|---|---|---|---|---|---|---|---|---|---|---|
| Organisms | | | | | | | | | | | | | | |
| Staphylococcus aureus 209 P | * | 1.5 | 6.2 | 6.2 | 25 | 25 | 1.5 | 1.5 | 6.2 | 1.5 | 1.5 | 1.5 | 1.5 | 1.5 |
| Staph. aureus (Resistant) | * | 3.1 | 25 | 25 | 100 | 25 | 6.2 | 6.2 | 25 | 6.2 | 1.5 | 6.2 | 6.2 | 6.2 |
| Escherichia coli NIHJ | * | 100 | >100 | >100 | >100 | 25 | >100 | >100 | >100 | 100 | >100 | >100 | >100 | >100 |
| Shigella flexneri 2a | * | 12.5 | 100 | 100 | 100 | 6.2 | >100 | 25 | 100 | 25 | 25 | 100 | 100 | 25 |
| Sh. flexneri 16 (Resistant) | * | 12.5 | 100 | 100 | 100 | 6.2 | >100 | 100 | 100 | 100 | 100 | 100 | 100 | 100 |
| Pseudomonas aeruginosa | * | >100 | 100 | 100 | 100 | 100 | >100 | 100 | 100 | >100 | >100 | >100 | 100 | 100 |
| Candida albicans | ** | 6.2 | 6.2 | 25 | 100 | 100 | >100 | 100 | 25 | 100 | 100 | 100 | 100 | 25 |
| Trichophyton asteroides | *** | 0.4 | 6.2 | 6.2 | 25 | 25 | 25 | 6.2 | 25 | 6.2 | 6.2 | 25 | 25 | 6.2 |
| Tri. interdigitale | *** | 0.8 | 100 | 6.2 | 25 | 25 | 25 | 25 | 25 | 6.2 | 6.2 | 25 | 25 | 25 |
| Tri. rubrum | *** | 0.4 | 6.2 | 1.5 | 6.2 | 6.2 | 25 | 6.2 | 1.5 | 1.5 | 1.5 | 1.5 | 6.2 | 1.5 |

\*: cultivated in Neutrient Agar at 37°C. for 18 hours.
\*\*: cultivated in Sabouraud's Agar at 27°C. for 48 hours.
\*\*\*: cultivated in Sabouraud's Agar at 27°C. for one week.

[a]
(1) 2-(2'-Phenylhydrazino)tropone
(2) 2-(2'-p-Chlorophenylhydrazino)tropone
(3) 2-(2'-m-Chlorophenylhydrazino)tropone
(4) 2-(2'-m-Nitrophenylhydrazino)tropone
(5) 2-(2'-Methylhydrazino)tropone
(6) 6-Isopropyl-2-(2'-phenylhydrazino)tropone
(7) 4-Isopropyl-2-(2'-phenylhydrazino)tropone
(8) 2-(2'-p-Bromophenylhydrazino)tropone
(9) 2-(2'-p-Tolylhydrazino)tropone
(10) 2-(2'-o-Tolylhydrazino)tropone
(11) 2-(2'-m-Tolylhydrazino)tropone
(12) 2-(2'-o-Methoxyphenylhydrazino)tropone
(13) 2-(2'-p-Methoxyphenylhydrazino)tropone 2-Hydrazinotropone derivatives (I) of this invention are easily prepared by the reaction of 2-methoxytropone derivatives (II) with hydrazine derivatives (III) according to a known method, for example, the method described in Chem. Pharm. Bull. 13 (4), 457–464 (1965).

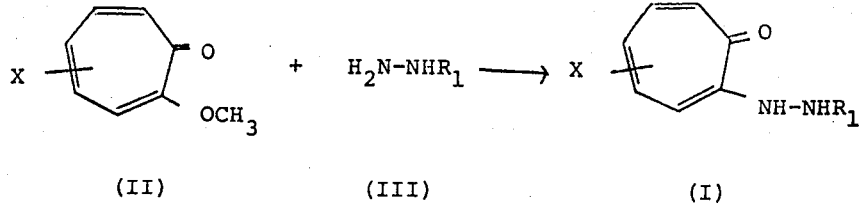

In the above formulae, $R_1$ and X are the same as above.

The compositions containing the compounds of the formula (I) used for a treatment of dermatomycosis of animals may be employed in a form of embrocation agents, ointments, medicated bath agents and, most preferebly, aerosoles and these preparations may be prepared by usual methods.

The compositions of this invention may include one or more of the following additives; a solvent such as ethanol, benzyl alcohol or glycol salicylate, keratolytics such as salicylic acid, chrysarobin, unsaturated fatty acid such as undecylenic acid and optionally further known fungicides such as pentachlorophenol, thiabendazole, haloprogin and griseofulvin.

The amount of the active component to be incorporated into the preparation is 0.01 – 5 % (w/v), preferably 0.1 – 2 % (w/v) and the preparation is usually applied to lesion parts of the infected animals for 3–14 days.

The compounds (I) of this invention show low toxicities to animals. For example, acute toxicities of 2-(2'-phenylhydrazino)tropone to mice were shown in the Table II.

Table II

| Acute Toxicities in Mice | | |
|---|---|---|
| | ($LD_{50}$ mg/kg) | |
| Mice Administration | male | female |
| subcutaneous injection | >5000 | >5000 |
| oral administration | >5000 | >5000 |
| percutaneous administration | >1000 | >1000 |

Examples and clinical data of the composition of this invention are shown below.

EXAMPLE

| Aerosol | |
|---|---|
| 2-(2'-Phenylhydrazino)tropone | 1 g. |
| Benzyl alcohol | 31 g. |
| Ethanol (99%) | 15.7 g. |
| Freon-12 (Du Pont) dichlorodifluoromethane | 35 g. |
| Freon-11 (Du Pont) trichlorofluoromethane | 35 g. |
| | 117.7 g. |

The 2-(2'-phenylhydrazino)tropone was dissolved in the mixture of the benzyl alcohol and the ethanol at room temperature and the solution was put into an aerosol container. The propellents were filled into the container through the valve attached thereto.

The concentration of the active component was one percent by weight per volume.

1. The above aerosol was applied to the lesion of dermatomycosis of milch cows (age : 6–8 months, female of Holstein) once a day for a week. The results are shown in the Table III.

Table III

| | | Clinical Data in Cows | | | |
|---|---|---|---|---|---|
| | Clinical Condition | | | Effectiveness | |
| No. | Position of lesions | size (cm) | Clinical findings | after one week | after 4 weeks |
| 1 | Left abdominal part | 4.5 × 3.0 | severe thick crust and strong falling-out of hair | start to grow hair | cured |
| 2 | Left neck part | 4.0 × 3.5 | thick crust and middle falling-out of hair | start to grow hair | cured |
| | | 2.8 × 2.5 | thick crust and middle falling-out of hair | starts to grow hair | cured |
| 3 | Lower part of | 2.6 × 4.0 | falling-out of hair | grows hair on the central area | cured |

Table III -continued

Clinical Data in Cows

| | Clinical Condition | | | Effectiveness | |
|---|---|---|---|---|---|
| No. | Position of lesions | size (cm) | Clinical findings | after one week | after 4 weeks |
| | Left shoulder | 1.8 × 2.2 | falling-out of hair | starts to grow hair | cured |
| 4 | Right neck part | 3.2 × 2.7 | falling-out of hair | starts to grow hair | cured |
| | | 4.0 × 3.5 | falling-out of hair | starts to grow hair | cured |
| 5 | Lower part of vulva | 5.0 × 2.1 | falling-out of hair | starts to grow hair | cured |
| | | 3.5 × 3.0 | falling-out of hair | starts to grow hair | cured |

2. The above aerosol was applied to the lesion of dermatomycosis of 8 horses (age : 3–5 years, male and female of Thoroughbred) once a day for 5 – 7 days. As the results, the hair started to grow after one week and the lesion was completely cured after four weeks.

What is claimed is:

1. A topical fungicidal composition which comprises, as an active component in an amount sufficient to inhibit dermatomycosis of an animal, a 2-hydrazinotropone having the formula

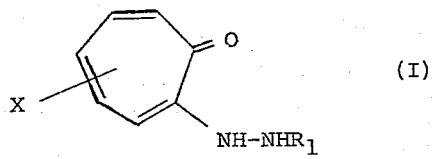

or a dermatologically acceptable acid addition salt thereof, wherein $R_1$ represents alkyl having from one to 4 carbon atoms or phenyl which may be substituted with halogen, alkyl having from one to four carbon atoms, nitro or alkoxy from one to four carbon atoms, X represents hydrogen atom or an alkyl group having from one to four carbon atoms together with benzyl alcohol.

2. The topical fungicidal composition of claim 1 wherein said active component is a 2-hydrazinotropone having the formula (I) or a dermatologically acceptable acid addition salt thereof wherein $R_1$ is phenyl which may be substituted with halogen, alkyl having from one to four carbon atoms, nitro or alkoxy having from one to four carbon atoms and X is hydrogen atom.

3. The topical fungicidal composition of claim 1 wherein the 2-hydrazinotropone is 2-(2'-phenylhydrazino)tropone.

4. An aerosol composition confined under pressure in an aerosol dispensing container comprising a 2-hydrazinotropone or a dermatologically acceptable acid addition salt thereof in an amount of from about 0.01 to about 5 percent by weight of said composition, a solvent selected from the group consisting of ethanol, benzyl alcohol and glycol salicylate and a propellant mixture of about 30 percent by weight of trichlorofluoromethane and about 30 percent by weight of dichlorodifluoromethane, said 2-hydrazinotropone having the formula

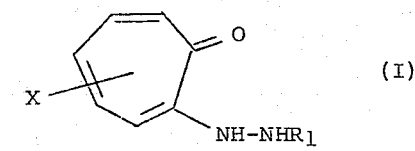

wherein $R_1$ represents alkyl having from one to four carbon atoms or phenyl which may be substituted with halogen, alkyl having from one to four carbon atoms, nitro or alkoxy having from one to four carbon atoms, X represents hydrogen or alkyl having from one to four carbon atoms.

5. A topical fungicidal composition which comprises, as an active component in an amount sufficient to inhibit dermatomycosis of an animal, a 2-hydrazinotropone having the formula

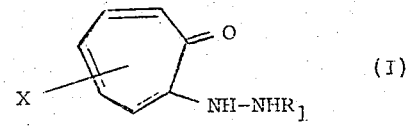

or a dermatologically acceptable acid addition salt thereof, wherein $R_1$ represents alkyl having from one to four carbon atoms or phenyl which may be substituted with halogen, alkyl having from one to four carbon atoms, nitro or alkoxy from one to four carbon atoms, X represents hydrogen atom or an alkyl group having from one to four carbon atoms together with glycol salicylate.

6. A process for the treatment of dermatomycosis of an animal which comprises administering topically to said animal a composition comprising an amount sufficient to inhibit dermatomycosis of an animal of a 2-hydrazinotropone having the formula

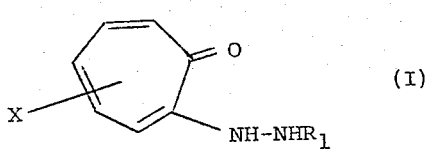

or a dermatologically acceptable acid addition salt thereof, wherein $R_1$ represents alkyl having from one to four carbon atoms or phenyl which may be substituted with halogen, alkyl having from one to four carbon atoms, nitro or alkoxy having from one to four carbon atoms, X represents hydrogen or alkyl having from one to four carbon atoms together with a dermatologically acceptable carrier therefor.

7. A process of claim 6 wherein said active component is a 2-hydrazinotropone having the formula (I) or a dermatologically acceptable acid addition salt thereof wherein $R_1$ is phenyl which may be substituted with halogen, alkyl having from one to four carbon atoms, nitro or alkoxy having from one to four carbon atoms and X is hydrogen atom.

8. A process of claim 6 wherein the 2-hydrazinotropone is 2-(2'-phenylhydrazino)tropone.

* * * * *

UNITED STATES PATENT OFFICE
CERTIFICATE OF CORRECTION

Patent No. 3,920,843　　　　　　　　　　Dated November 18, 1975

Inventor(s) Noritoshi Kitano et al.

It is certified that error appears in the above-identified patent and that said Letters Patent are hereby corrected as shown below:

Columns 1-2, Table 1: at "Staphlococcus aureus 209P", under

"6", "7", "9", "10", "11", "12" and "13", and at

"Staph. aureus (Resistant)", under "10", insert

-- $\leqq$ --- before "1.5".

Signed and Sealed this

Second Day of November 1976

[SEAL]

*Attest:*

RUTH C. MASON　　　　　　　　　　C. MARSHALL DANN
*Attesting Officer*　　　　　　　　*Commissioner of Patents and Trademarks*